Patented Nov. 16, 1943

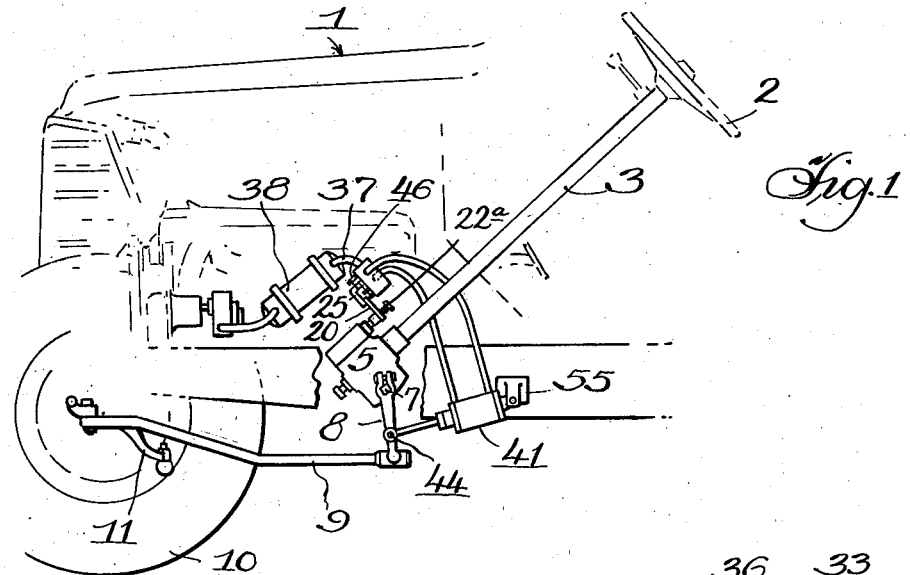
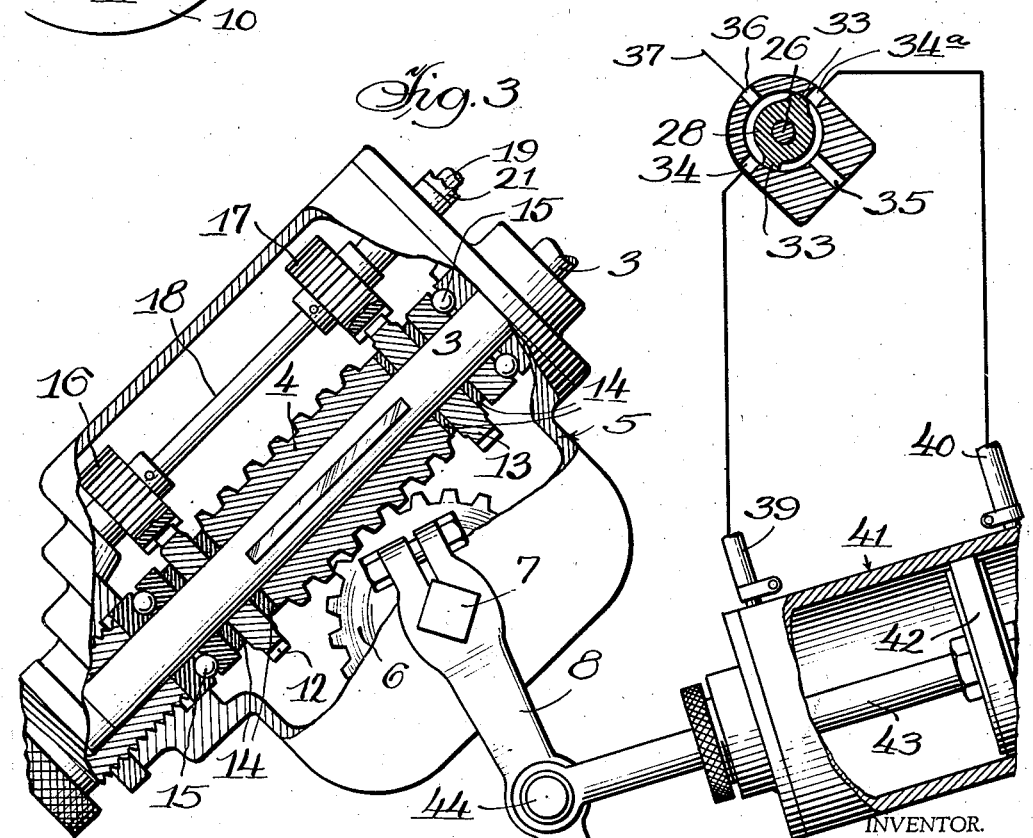

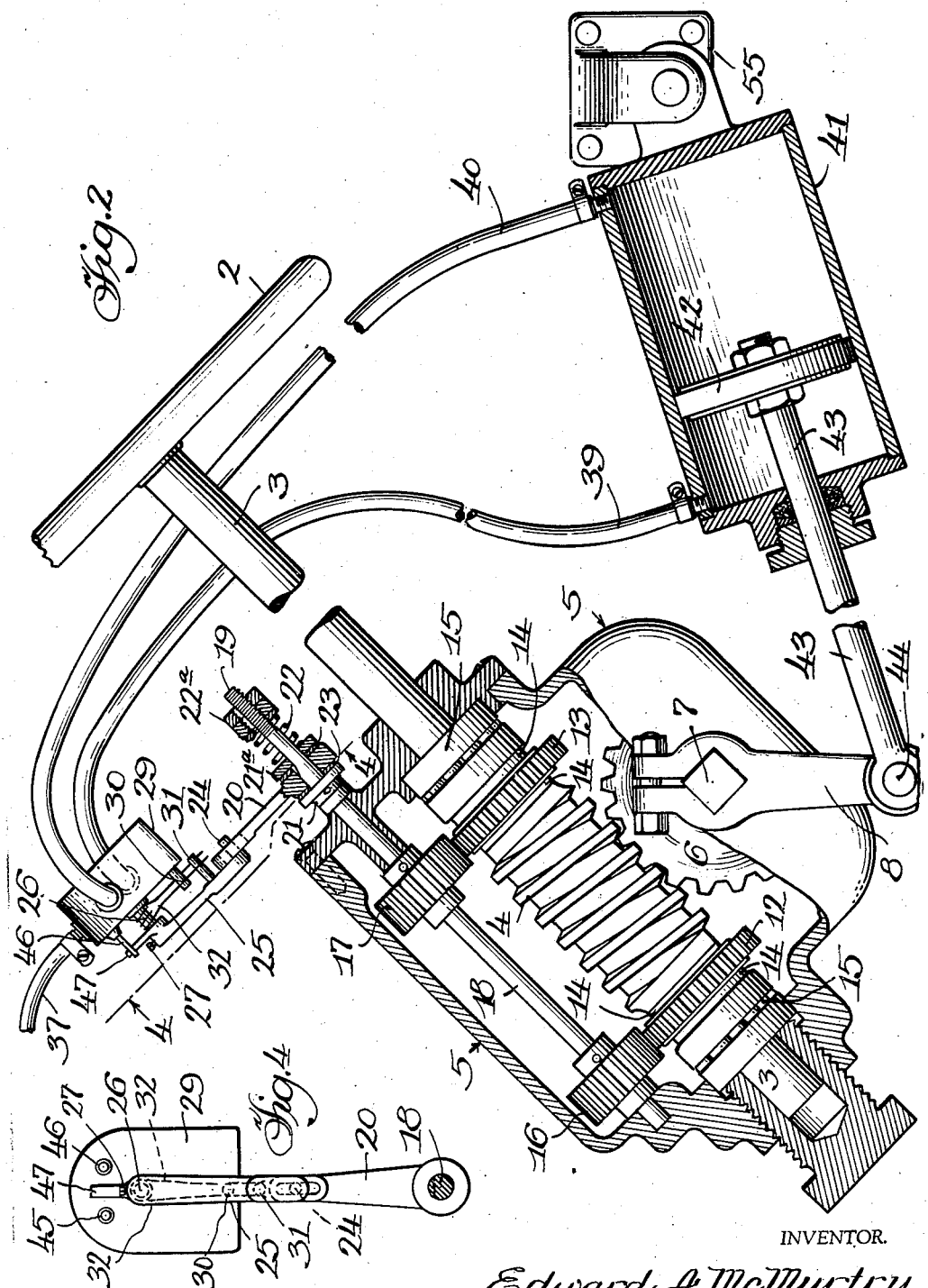

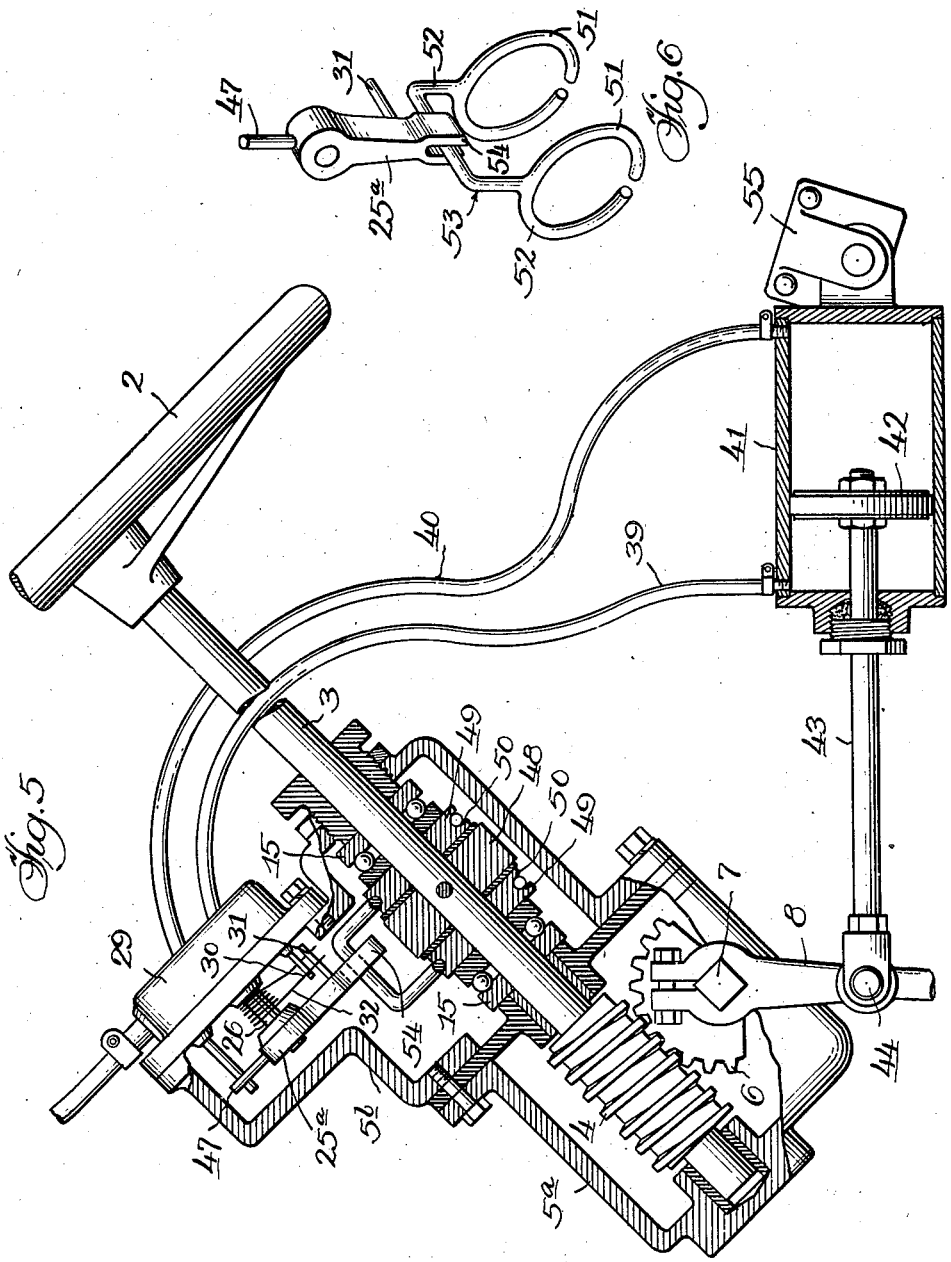

2,334,343

UNITED STATES PATENT OFFICE 2,334,343

STEERING APPARATUS

Edward A. McMurtry, Chicago, Ill.

Application November 14, 1940, Serial No. 365,615

16 Claims. (Cl. 180—79.2)

The invention relates to steering apparatus and more particularly to a power drive for the steering mechanism of a self propelled vehicle or the like.

The invention comprehends a novel power actuated mechanism operating in synchronism with the manual turning of the steering mechanism whereby to greatly minimize and relieve the operator of the manual effort now required in steering an automotive vehicle. It is an object of the invention to provide power means to assist the operator of a vehicle, such as an automobile, truck, bus or the like in turning the wheels thereof whereby the wheels of the heaviest vehicle may be turned without substantial muscular effort on the part of the operator. Another object is to provide power means which will operate automatically, and substantially instantaneously, upon the manual turning of the steering wheel by the operator and which will automatically and substantially instantaneously cease operating when the operator ceases turning the steering wheel.

A further object is to provide a novel attachment which can be quickly applied to and used with the various standard steering mechanisms in use today on automobiles, trucks, busses and the like or can be initially installed as standard equipment. The invention is so designed and constructed that should the power actuating means fail, the vehicle may be controlled by manual operation. The invention further comprehends the provision of a power means which is automatic but always under the control of the operator and which can operate only when the operator is turning the steering wheel.

A further object is to provide a steering mechanism controlling the power means which is positive in action and in which there is no play or lost motion between the steering wheel and the vehicle wheels.

Another object is to provide a power means for assisting the operator in turning the steering wheels whereby the worm on the steering rod may be of greater pitch than those employed with a purely hand operated device thereby lessening the amount of turning of the steering wheel.

Further objects are to provide a construction of maximum simplicity, efficiency, economy and ease of assembly and operation and repair, and such further objects, advantages and capabilities as will later more fully appear and are inherently possessed thereby.

The invention further resides in the construction, combination and arrangement of parts illustrated in the accompanying drawings, and while I have shown therein a preferred embodiment, it is to be understood that the same is susceptible of modification and change, and comprehends other details, arrangements of parts, features and constructions without departing from the spirit of the invention.

In the drawings:

Fig. 1 is a fragmentary side view partly diagrammatic of an automobile equipped with a device embodying the invention.

Fig. 2 is a vertical section of the steering apparatus of Fig. 1, with certain parts being shown in elevation for convenience.

Fig. 3 is a vertical section of the lower end of the steering rod and some of the associated parts, some of the parts being shown in elevation.

Fig. 4 is an end view looking in the direction of the line 4—4 of Fig. 2.

Fig. 5 is a view similar to Fig. 2 of another form of steering apparatus.

Fig. 6 is an enlarged perspective view of the control member shown in Fig. 5.

In the embodiment of the invention shown in Figs. 1 to 4 of the drawings there is illustrated an automobile 1 having steering wheel 2 mounted at the upper end of the steering rod or shaft 3 which may be encased within the usual steering post, the rod or shaft having fixed or keyed to its lower end a worm 4 enclosed within a stationary housing 5. The worm 4 is in continuous mesh with gear segment 6 mounted in the housing 5 on a shaft 7, one end of which is polygonal and extends outside the housing where it is attached to lever arm 8 connected at its other end to rod 9 to operate the front wheel 10 of the car through steering knuckle 11 in the manner well known in the art.

On the steering rod 3 and at each end of the worm 4 are thrust bearing assemblies comprising loosely mounted pinions 12 and 13 on each side of which are friction collars or washers 14 separating the pinions from the worm and from ball bearing retainers 15 on the rod 3 and abutting at each end of the housing 5. Sufficient space is allowed between the worm and the ball bearing retainers whereby the thrust of the worm when turned in one direction will frictionally clutch or clamp a pinion between the worm and a ball bearing retainer and rotate that pinion while the other pinion idles on the shaft.

The pinions 12 and 13 are in continuous mesh with pinions 16 and 17 keyed to shaft 18 in the upper part of the housing 5. One end 19 of said shaft extends beyond the housing through a suitable opening, and on which is loosely mounted one end of a lever or handle 20, the end 19 being milled flat on one side beyond this lever or handle 20. Between the lever and the housing 5 a collar 21 is keyed to the shaft and on the other side of the lever is collar 21ᵃ having a flat side to key it to the milled part of the shaft. Spring 22 is placed on end 19 of shaft 18 and is held in place between the collar 21ᵃ and one or more lock nuts 22ᵃ threaded on the shaft whereby the spring exerts pressure against collar 21ᵃ and the lever to frictionally and tensionally hold the lever between the collars 21 and 21ᵃ in such manner that this lever will rotate with the shaft 18 through a predetermined arc. Composition or other friction washers 23 are preferably provided on the shaft on each side of lever 20.

The free or outer end of lever 20 is slotted (see Fig. 4) to receive a crank pin 24 on one end of the lever arm 25 which is fixed at its other end on the end of valve shaft 26 by means of set screw 27. Valve shaft 26 is attached to valve 28 in valve chamber 29 and extends some distance outside the chamber. In order to normally maintain the levers 20 and 25 in alignment pins or projections 30 and 31 are provided on the chamber and lever 25 respectively and spring 32 is wound around valve stem 26 with its ends extending on each side of pins 30 and 31.

When the levers 20 and 25 are in alignment the projections or enlargements 33 on valve 28 are in position to close the ports 34 and 34ᵃ in the valve chamber. This valve chamber is also provided with ports 35 open to the atmosphere and 36 to which is connected one end of conduit or hose 37, the other end of which is connected to air pressure tank 38 suitably connected to a source of air pressure operated by the engine of the vehicle or by an independent motor as desired.

The ports 34 and 34ᵃ are connected by pipes or hose 39 and 40 to opposite ends of cylinder 41 in which is a piston 42 secured to one end of shaft 43 the other end of which is provided with a bearing journal to receive pin 44 on lever arm 8 of the steering mechanism.

When the steering wheel 2 is turned by the operator the thrust of the worm in one direction or the other forces it against and frictionally engages either pinion 12 or 13 to thereby turn shaft 18, through pinion 16 or 17, in one direction or the other. As the shaft 18 rotates it rotates levers 20 and 25, the force of spring 22 being such that it will create a friction between shaft 18 and lever 20 sufficient to overcome the force of spring 32, and the valve 28 is turned to open ports 34 and 34ᵃ thereby permitting passage of compressed air or other fluid from tank 38 to cylinder 41 to move piston 42 in one direction or the other depending upon whether opening 34 or 34ᵃ is connected with the inlet port 36 through the arcuate slot formed between the projections 33, and in consequence push or pull against the arm 8 and rod 9 to assist in turning the steering knuckle 11 and the front wheels.

Pins 45 and 46 (Figs. 2 and 4) extend from the valve chamber to contact extension 47 on lever 25 to form stop members and allow movement of this lever and the valve through a predetermined arc just sufficient to open the valve ports 34 and 34ᵃ so that upon discontinuance of the manual turning of the steering wheel 2 the valve will have to turn through a small arc to close the ports and cut off the air supply, stopping the power means. The shaft 18 will continue to turn but the lever 20 being but frictionally connected thereto will not move after the extension 47 of lever 25 contacts the stop members 45 or 46.

Upon termination of movement of shaft 18 spring 32 will immediately act to return the levers 20 and 25 to their aligned position to close the valve. In doing this, spring 32 will turn lever 20 and shaft 18 slightly, the pinions 12 and 13 being freely rotatable on shaft 3 when the worm thrust is relieved and will not then rotate the pinions 16 and 17, and will permit this movement of shaft 18 and lever 20. This is so whether or not the power means is strong enough to continue turning the worm, as such operation of the worm will not exert a thrust which results only when the worm operates or moves the gear segment and not when the segment operates the worm.

Assume that the power device is sufficiently powerful to turn the vehicle wheels, so that the operator needs only to move the steering wheel as a control member. When he turns the steering wheel the valve will be actuated and the power device will operate as long as the thrust friction is maintained by the manual movement of the steering wheel. If the steering wheel is stopped at any point in the turning, the power device will operate for just an instant to release the thrust friction caused by the motion of the steering wheel, thus releasing the friction holding pinion, 12 or 13 as the case may be, and the control valve will be returned to neutral by the action of spring 32, cutting off the power.

If the power device is of low power and is not quite able to move the vehicle wheels, the operator may stop the movement of the steering wheel at any point, and this will hold the wheels in a given position, but in this case the power may remain on until a slight reverse of the motion of the steering wheel will release the friction and then the power will be cut off by action of spring 32. If the motion of the steering wheel is continued in the new direction the thrust friction will cause the opposite control action and thus reverse the power application in the new direction.

Assume that in the second case the vehicle wheels are on wet ice or slippery pavement there is temporarily the particular action of the first case where the limited power device can and will move the wheels under these conditions, subject to the control motion of the steering wheel.

Assume that the wheels of the vehicle strike a rut with sufficient force to cause them to be moved suddenly in the same direction as they are being turned, and thus, momentarily, lead the power device and the motion of the steering wheel. Under these conditions the thrust friction holding the control valve open, will be released and the power cut off for an instant, until the continued turning of the steering wheel by the operator restores the thrust friction thus applying power again, provided the operator has been continually turning the wheel.

Under no conditions can the power device or the movement of the vehicle wheel assembly lead the control motion of the steering wheel without having the power momentarily cut off until the continued action of the steering wheel causes it to be restored.

Under no conditions can the power device be put into operation in such a way as to lead the motion of the steering wheel and lock the wheels at the end of the complete turn in either direction.

Of course it is understood that, at all times, a slight reversal of movement of the steering wheel will release the thrust friction restoring the valve to neutral and cutting off the power or, in the case of appreciable movement in the new direction, reversing the power.

In Figs. 5 and 6 is shown another mechanism for operating or actuating the power means and helps to illustrate the importance of the thrust of the worm to accomplish this.

In this important and simplified form of the invention, the steering rod is provided with the usual worm 4 in mesh with gear segment 6 and operating arm 8 through shaft 7. Housing 5ª is provided for the worm and segment. Adjacent and connected to (or integral with this housing) and also surrounding the shaft 3 is housing 5ᵇ in which is located the mechanism for actuating valve 28 in chamber 29. This mechanism comprises a sleeve or collar 48 keyed to shaft 3 and on each side of which and also surrounding the shaft are thrust bearing assemblies including collars 49 between which and the ends of the chamber 5ᵇ are ball bearing retainers 15. The collars 49 are provided with perimetric grooves 50 for receiving split rings 51 at the ends of arms 52 of yoke 53. These split rings are of resilient material and are so made as to frictionally engage the grooves of collars 49 with sufficient tension that movement of either collar will cause it to carry, and rotate with it, the split ring and yoke.

Yoke 53 extends between the forked ends 54 of arm or lever 25ª which is keyed to or otherwise secured upon valve stem 26 of valve 28 in chamber 29. This valve is operated by the arm 25ª in the same manner as it is operated by arm or lever 25 in the construction shown in Figs. 1–4.

The operation of this mechanism is substantially the same as that shown in Figs. 1–4. When the steering wheel 2 is turned the worm 4, in operating the segment 6, will cause a thrust of the rod or shaft 3 in one direction or the other, thereby causing a frictional engagement or clutching connection between the sleeve or collar 48 and one or the other of the collars 49 whereby to lock the collar 49 between the sleeve 48 and a thrust bearing 15, causing the collar 49 to turn with the steering rod. The collar will carry with it the yoke 53, moving the lever 25ª in one direction or the other to open the valve 28 in the valve chamber 29 and causing the power means to operate and assist in the movement of the arm 8, and steering mechanism connected to it and the steering wheels, whereby to turn the latter. As is shown, spring 32 and arms 30 and 31 are provided on the valve stem 26 and valve chamber 29 and lever 25ª in the same manner as shown in Figures 1–4 to maintain the valve in closed position. The lever 25ª is also provided with extension 47 and the valve chamber is provided with stop members or projections 45 and 46 to prevent the lever 25ª from turning through an angle or arc sufficient to open the valve fully.

As shown in both embodiments, the cylinder 41 is preferably mounted for slight rotation on bracket 55 suitably attached to the vehicle frame.

It is apparent that the other types of controls and other sources of power, such as vacuum from the manifold, oil, or the like could be used in place of the compressed air, or that other power means such as electricity could be used and that the device is capable of use with devices other than automobiles without departing from the spirit of the invention.

Having thus disclosed the invention I claim:

1. Vehicle steering apparatus comprising a steering wheel and rod, a worm on said rod, a member operated by said worm, an arm connected to said member for moving the wheels of the vehicle, power means connected to said arm to assist in its movement, a member adjacent each end of the worm and either member adapted to be clutched to and rotatable with the worm depending upon the direction of thrust of the worm, a shaft adjacent said worm, pinions on the shaft and connected to the members so as to be moved thereby when manual operation of the steering wheel causes a thrust of the worm, a valve for actuating said power means and means connecting said pinions and valve whereby movement of a pinion upon manual movement of the steering wheel will open said valve.

2. Vehicle steering apparatus comprising a steering wheel and rod, a worm on said rod, a member operated by said worm, an arm connected to said member for moving the wheels of the vehicle, members frictionally engageable by the worm when manual movement of the steering wheel causes a thrust of the worm, power means connected to said arm to assist in its movement, a shaft adjacent said worm, pinions on the shaft and adapted to be moved by said members, a valve for actuating said power means and means connecting said shaft and valve whereby movement of the worm by manual movement of the steering wheel will cause it to engage a pinion to open said valve, and means for closing said valve upon cessation of manual movement of said steering wheel.

3. Vehicle steering apparatus comprising a steering wheel and rod, a worm on said rod, a segment operated by said worm, an arm connected to said segment for moving the wheels of the vehicle, members frictionally engageable and movable by the worm upon manual movement of the steering wheel, power means connected to said arm to assist in its movement, a shaft adjacent said worm, pinions on the shaft and adapted to be moved by one of the members upon said manual movement of the worm, a valve for actuating said power means, means connecting said shaft and valve whereby movement of a pinion will open the valve, and a spring adapted to close the valve upon discontinuance of the thrust friction between the worm and the member.

4. Vehicle steering apparatus having a steering wheel, a worm operated thereby and a housing for said worm, a member operated by the worm, means connected to the member for steering the wheels of the vehicle, a power source connected to said means to assist in such movement and provided with a valve, a pair of pinions movable by the thrust of the worm upon manual movement of the steering wheel, a shaft in said housing with one end extending beyond said housing, pinions keyed to said shaft and in mesh with the worm pinions, valve actuating means controlled by said shaft, and means for closing the valve upon discontinuance of the worm thrust.

5. Vehicle steering apparatus comprising a steering wheel and rod, a worm on the rod, thrust bearings mounted on said rod, a member operated by the worm, an arm connected to the member for moving the wheels of the vehicle, power means for assisting in such movement, means adapted to frictionally engage either of said thrust bearings and rotate with the rod upon manual movement of the steering wheel, a valve on said power means and having a valve shaft actuated by said last mentioned means and a spring connected to said valve shaft and adapted to close said valve upon discontinuance of said worm thrust.

6. Vehicle steering apparatus comprising a steering wheel and rod, thrust bearings on said rod, a worm on said rod, a segment operated by said worm, means connected to said segment for moving the wheels of the vehicle, power means for assisting in said movement, means adapted to be moved into clutching engagement with either of said thrust bearings by the thrust of the worm resulting from manual turning of the steering wheel, members adjacent said worm and connected to said last mentioned means, a valve for said power means and having a valve shaft, an arm on said shaft and movable by said members for opening said valve and means associated with the valve shaft for closing the valve upon discontinuance of said worm thrust.

7. Vehicle steering apparatus comprising a steering wheel and rod, a worm on said rod, thrust bearings associated therewith, a segment operated by said worm, means connected to said segment for moving the wheels of the vehicle, power means for assisting in said movement, a member keyed to the rod and adjacent the worm, means on each side of said member associated with said thrust bearings and adapted to be clutched to and rotated with the member by friction arising from the thrust of the worm resulting from manual turning of the steering wheel, said means being connected to said power means for actuation of said power means.

8. Vehicle steering apparatus comprising a steering wheel and rod, a worm on said rod, a segment operated by said worm, means connected to said segment for moving the wheels of the vehicle, power means for assisting in said movement, a sleeve adjacent the worm and keyed to the rod, collars on the rod on each side of the sleeve, either of which is adapted to be clutched by and rotate with the sleeve depending upon the direction of thrust of the worm resulting from manual turning of the steering wheel, a valve for actuating the power means, an arm connected to said valve, and means connecting said arm to said collars whereby movement of a collar will move the arm to open the valve.

9. Vehicle steering apparatus comprising a steering wheel and rod, a worm on said rod, a segment operated by said worm, means connected to said segment for moving the wheels of the vehicle, power means for assisting in said movement, a sleeve adjacent the worm and keyed to the rod, collars on the rod on each side of the sleeve, either of which is adapted to be clutched by and rotate with the sleeve depending upon the direction of thrust of the worm resulting from manual turning of the steering wheel, a valve for actuating the power means and split rings frictionally engaging the collars and attached together and connected with the valve, whereby movement of a collar will open the valve.

10. Vehicle steering apparatus comprising a steering wheel and rod, a worm on said rod, a segment operated by said worm, means connected to said segment for moving the wheels of the vehicle, power means for assisting in said movement, a sleeve adjacent the worm and keyed to the rod, collars on the rod on each side of the sleeve, either of which is adapted to be clutched by and rotate with the sleeve depending upon the direction of thrust of the worm resulting from manual turning of the steering wheel, a valve for actuating the power means and having a valve shaft, an arm on said shaft and split rings frictionally engaging the collars and rigidly attached together and connected with the valve arm whereby movement of a collar will move the arm to open the valve, means for limiting the movement of the arm and means for returning the arm to close the valve upon discontinuance of the worm thrust.

11. Vehicle steering apparatus comprising a steering wheel and rod, a worm on said rod, thrust bearings associated therewith, a segment operated by said worm, means connected to said segment for moving the wheels of the vehicle, power means for assisting in said movement, a member keyed to the rod and adjacent the worm, means on each side of said member and between said member and thrust bearings adapted to be clutched to and rotated with the member upon the thrust of the worm resulting from manual turning of the steering wheel, said means being connected to said power means for actuation of said power means, and means for shutting off the power means upon discontinuance of the manual turning of the steering wheel.

12. Vehicle steering apparatus comprising a steering wheel and rod, a worm on said rod, a segment operated by said worm, means connected to said segment for moving the wheels of the vehicle, power means for assisting in said movement, a sleeve adjacent the worm and keyed to the rod, collars on the rod on each side of the sleeve, either of which is adapted to be clutched by and rotate with the sleeve depending upon the direction of thrust of the worm resulting from manual turning of the steering wheel, a valve for actuating the power means, an arm on said valve, and means connecting said arm to said collars whereby movement of a collar will move the arm to open the valve, and means for closing the valve upon cessation of manual turning of the wheel and the consequent thrust of the worm.

13. Power mechanism for augmenting the manual turning movement in either direction of manually controlled steering apparatus and the like and in which the apparatus is provided with a steering shaft, a worm fixed thereon and subjected to a thrust when manually rotated in either direction, a tooth member in mesh with the worm and a connection from the member for turning the wheels of a vehicle, comprising a pair of collars loose upon the shaft but adapted to be clutched thereto upon the application of thrust to the worm, split rings carried by the collars, power control means connected to the split rings and to each collar and responsive to thrust in but one direction, and a power unit associated with and controlled by the control means and connected to the steering apparatus for relieving the operator of the manual effort and physical fatigue encountered in steering a power propelled vehicle.

14. Power mechanism for augmenting the manual turning movement in either direction of manually controlled steering apparatus and the like and in which the apparatus is provided with a steering shaft, a worm fixed thereon and subjected to a thrust when manually rotated in either direction, a tooth member in mesh with the worm and a connection from the member for turning the wheels of a vehicle, comprising a pair of collars loose upon the shaft but adapted to be clutched thereto upon the application of thrust to the worm, means frictionally carried by each collar, power control means connected to the first mentioned means and responsive to thrust in but one direction, and a power unit associated with and controlled by the control means and connected to the steering apparatus for relieving the operator of the manual effort and physical fatigue encountered in steering a power propelled vehicle.

15. A reversible power mechanism for assisting the turning movement of manually controlled apparatus including a manually rotatable shaft and a worm secured thereon and subjected to an end thrust each time that the operator rotates the shaft, comprising a pair of members normally loose upon the shaft but adapted to be clutched for rotation therewith each time the worm is subjected to an end thrust, a split ring associated with each collar and rotatable therewith, and a power unit connected to the manually controlled apparatus and including valve mechanism actuated by turning movement in either direction, and means for automatically and positively disconnecting the power unit upon the operator ceasing turning effort in either direction.

16. Power mechanism for augmenting the manual turning movement in either direction of manually controlled steering apparatus and the like and in which said apparatus is provided with a steering shaft, a worm fixed thereon and subjected to an end thrust when manually rotated in either direction, a tooth member in mesh with said worm and a connection from said member for turning the wheels of a vehicle, comprising a pair of collars loose upon said shaft but adapted to be clutched thereto upon the application of thrust to the worm, members frictionally engaging said collars for rotation therewith, an actuating lever in the path of said last mentioned members, a valve actuated by said lever for supplying fluid under pressure to said mechanism, and a power unit receiving the fluid under pressure and connected to the steering apparatus for relieving the operator of the manual effort and physical fatigue encountered in steering a power propelled vehicle.

EDWARD A. McMURTRY.